(12) United States Patent
Rothschild (10) Patent No.: US 7,991,792 B2
(45) Date of Patent: Aug. 2, 2011

(54) SYSTEM AND METHOD FOR EMBEDDING SYMBOLOGY IN DIGITAL IMAGES AND USING THE SYMBOLOGY TO ORGANIZE AND CONTROL THE DIGITAL IMAGES

(75) Inventor: Leigh M. Rothschild, Sunny Isles Beach, FL (US)

(73) Assignee: Rothschild Trust Holdings, LLC, Sunny Isles Beach, FL (US)

(*) Notice: Subject to any disclaimer, the term of this patent is extended or adjusted under 35 U.S.C. 154(b) by 159 days.

(21) Appl. No.: 12/317,727

(22) Filed: Dec. 29, 2008

(65) Prior Publication Data

US 2009/0171915 A1  Jul. 2, 2009

Related U.S. Application Data

(63) Continuation of application No. 11/202,688, filed on Aug. 12, 2005, now Pat. No. 7,475,092, which is a continuation-in-part of application No. 11/020,459, filed on Dec. 22, 2004, which is a continuation-in-part of application No. 10/998,691, filed on Nov. 29, 2004, now Pat. No. 7,450,163.

(51) Int. Cl.
*G06F 17/00* (2006.01)
(52) U.S. Cl. ......... 707/791; 707/802; 707/822; 707/828
(58) Field of Classification Search ........... 707/600–831
See application file for complete search history.

(56) References Cited

U.S. PATENT DOCUMENTS

| 2004/0135902 A1* | 7/2004 | Steensma ............... 348/231.99 |
| 2004/0145602 A1* | 7/2004 | Sun et al. .................. 345/720 |
| 2005/0036042 A1 | 2/2005 | Haas et al. |
| 2005/0258246 A1 | 11/2005 | Wolf et al. |
| 2006/0114337 A1 | 6/2006 | Rothschild |
| 2006/0114338 A1 | 6/2006 | Rothschild |
| 2006/0114514 A1 | 6/2006 | Rothschild |
| 2006/0114516 A1 | 6/2006 | Rothschild |
| 2006/0176516 A1 | 8/2006 | Rothschild |

* cited by examiner

*Primary Examiner* — Isaac M Woo (57) ABSTRACT

A method and system for designing and affixing symbology, e.g., an identifier, into digital and printed images and using that symbology to link these images to a global computer network to allow the organization and processing of these images both while in digital form, and later when in printed form are provided. The method includes the steps of capturing an image with a digital image capture device and creating a digital image file; associating at least one identifier to the digital image file; and encoding the at least one identifier of the digital image file. The identifier includes a site location number (SLN), a customer identification number (CIN), a date the image was taken (DIT) and a picture sequence number (PSN). The identifier will be printed with the image and be used to retrieve the image at a later date and process user requests.

11 Claims, 9 Drawing Sheets

AB ABCDEF 032002 ABC
SLN   CIN    DIT   PSN
                              ← 802

SYSTEM AND METHOD FOR EMBEDDING SYMBOLOGY IN DIGITAL IMAGES AND USING THE SYMBOLOGY TO ORGANIZE AND CONTROL THE DIGITAL IMAGES

CROSS REFERENCES TO RELATED APPLICATIONS

The present application is a continuation application of U.S. application Ser. No. 11/202,688, filed Aug. 12, 2005, now U.S. Pat. No. 7,475,092, which is a continuation-in-part application of U.S. application Ser. No. 11/020,459, filed Dec. 22, 2004 entitled "SYSTEM AND METHOD FOR EMBEDDING AND RETRIEVING INFORMATION IN DIGITAL IMAGES", which is a continuation-in-part application of U.S. application Ser. No. 10/998,691, filed Nov. 29, 2004 now U.S. Pat. No. 7,450,163 entitled "DEVICE AND METHOD FOR EMBEDDING AND RETRIEVING INFORMATION IN DIGITAL IMAGES", the contents of all of which are hereby incorporated by reference in their entireties.

BACKGROUND OF THE INVENTION

1. Field of the Invention

The present disclosure relates generally to digital image processing, and more particularly, to systems and methods for embedding and retrieving information in digital images and using the information to organize, process and control the digital images. The present disclosure also relates to a method and system for designing and affixing symbology into digital and printed images and using that symbology to link these images to a global computer network to allow the organization and processing of these images both while in digital form, and later when in printed form.

2. Description of the Related Art

Photographs are taken for a variety of personal and business reasons. During the course of a year, an individual may take numerous photographs of various events. During these events, quite often there are a variety of different individuals and items present in these photographs. In the prior art, when one desires to catalog these images in a particular order, they usually are left to placing these images manually into photograph albums. This is a very extensive, manual procedure requiring a significant amount of time. In addition, it is very limited with regard to the amount of information that can be associated with the image in a quick and easy manner. While some photo albums allow the writing and placing of text, the entering of this data is a very time consuming and arduous affair. Once having sorted these images into particular albums which may represent categories of interest, it is extremely difficult to retrieve and/or reorganize the images into other categories.

With the advent of digital cameras and digital imaging, the process of organizing images and associating information with the images has become even more difficult. Firstly, upon capturing an image with a digital camera, the camera simply gives the image a numerical file name which usually has no meaning to the user and makes it difficult to retrieve the image at a later date. Secondly, with the technological advances in file size compression and increased capacity of storage media, several hundred images may be taken before a user downloads the images to a computer or other device, making it a very time consuming task to associate information to each image.

Therefore, a need exists for techniques for easily associating information about an image to the image and using the information to control and retrieve the image. A further need exists for encoding the associated information so that the associated information may be unobtrusively presented with the image in printed form and using the encoded information to organize, control and manipulate the image.

SUMMARY OF THE INVENTION

Devices, systems and methods for capturing, storing, allowing user input, receiving internal input, processing, transmitting, scanning, and displaying digital images are provided. Digital photography has gained a substantial share of the worldwide photographic market. More and more cameras record images in digital form and more and more of these images are stored digitally for retrieval or archival purposes on home and business computers and on the Global Computer Network, e.g., the Internet. The present disclosure describes hardware devices, systems and methods that will facilitate embedding information into digital images of any type (e.g., jpeg, bmp, tiff, etc.) to organize, control and manipulate these images both while in digital form, and later when in printed form. Furthermore, the present disclosure describes designing and imbedding symbology or identifiers into digital images of any type (jpeg, bitmap, tiff, gif, etc.) to organize, control and manipulate these images both while in digital form, and later when in printed form.

In one aspect of the present disclosure, as selected digital images are printed by a user, if the user elects, the images will be printed with symbology that is visible in the printed images. This symbology or identifier will then be input to a hardware device by means of a scanner that is part of the hardware device or by means of a standard keyboard interface, or a character recognition capture device which translates user text input into alphanumeric characters. Alternatively, the device may have a voice recognition processor that translates human voice into alphanumeric characters, for user input. Once the hardware device has received and processed the symbology or identifier on the printed images, using standard communications techniques, the scanning/reading device will transmit the image identifier to a computer processor which then may optionally transfer it to the Global Computer Network, e.g., the Internet. The device will then receive information back from the local processor or Global Computer Network relating to the image, for example, the location of the file or files that contain the image, associated attachments, etc. Alternatively, the identifier may be directly entered into a local computing device or a computing device coupled to the Global Computer Network.

According to another aspect of the present disclosure, systems and methods are provided for searching for images based on information associated to the images or an identifier positioned on at least one image.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. Throughout the figures like reference numerals represent like elements.

Figure 1A:
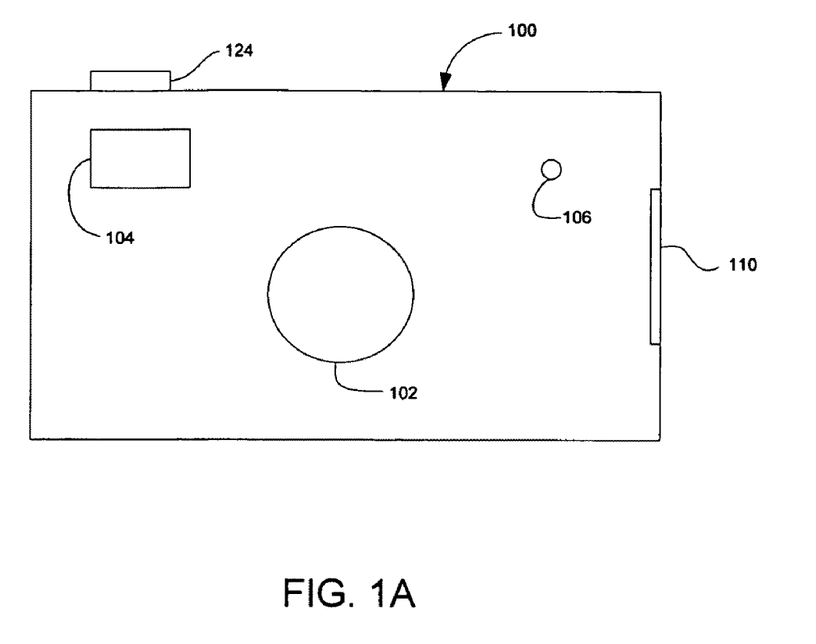
FIG. 1A is front view of a device for capturing digital images and embedding information in the captured images according to an embodiment of the present disclosure.
Figure 1B:
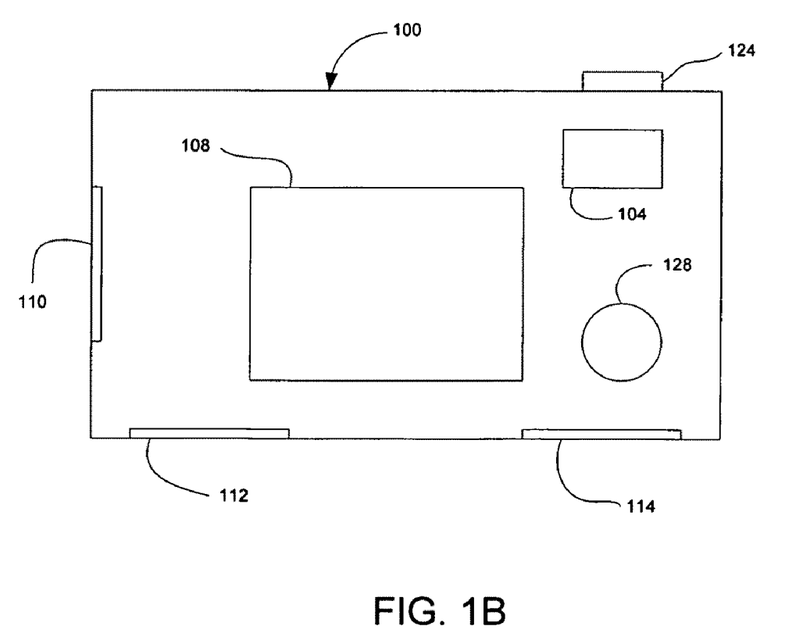
FIG. 1B is a rear view of the device illustrated in FIG. 1A.

Hardware devices, systems and methods thereof that will enable the embedding and retrieving of information in digital images are provided. The embedded information will enable a user to organize, process and control these images. Referring to FIGS. 1A and 1B, a device 100 for capturing images and associating information about the captured images is shown. The device 100 includes a lens 102 coupled to a capture module, which will be described in detail below, for capturing an image and a viewfinder 104 for correctly positioning the device when capturing an image. The device 100 further includes a microphone 106 for acquiring audio, from the user of the device or from the subject of the image, which may be associated with the image.

A rear side of the device 100 is illustrated in FIG. 1B where a display module 108 is provided for displaying the captured image. As will be described in more detail below, the display module 108 may include a touch screen for facilitating user input of information to be associated with a digital image. The device 100 further includes a storage module 110 for storing a plurality of images, a transmission module 112 for transmitting the plurality of images to another device, e.g., a personal computer, a personal digital assistant (PDA), a server residing on the Internet, etc., and a scanning module 114 for scanning and inputting information to be associated with an image and for reading information from printed images.

Figure 2:
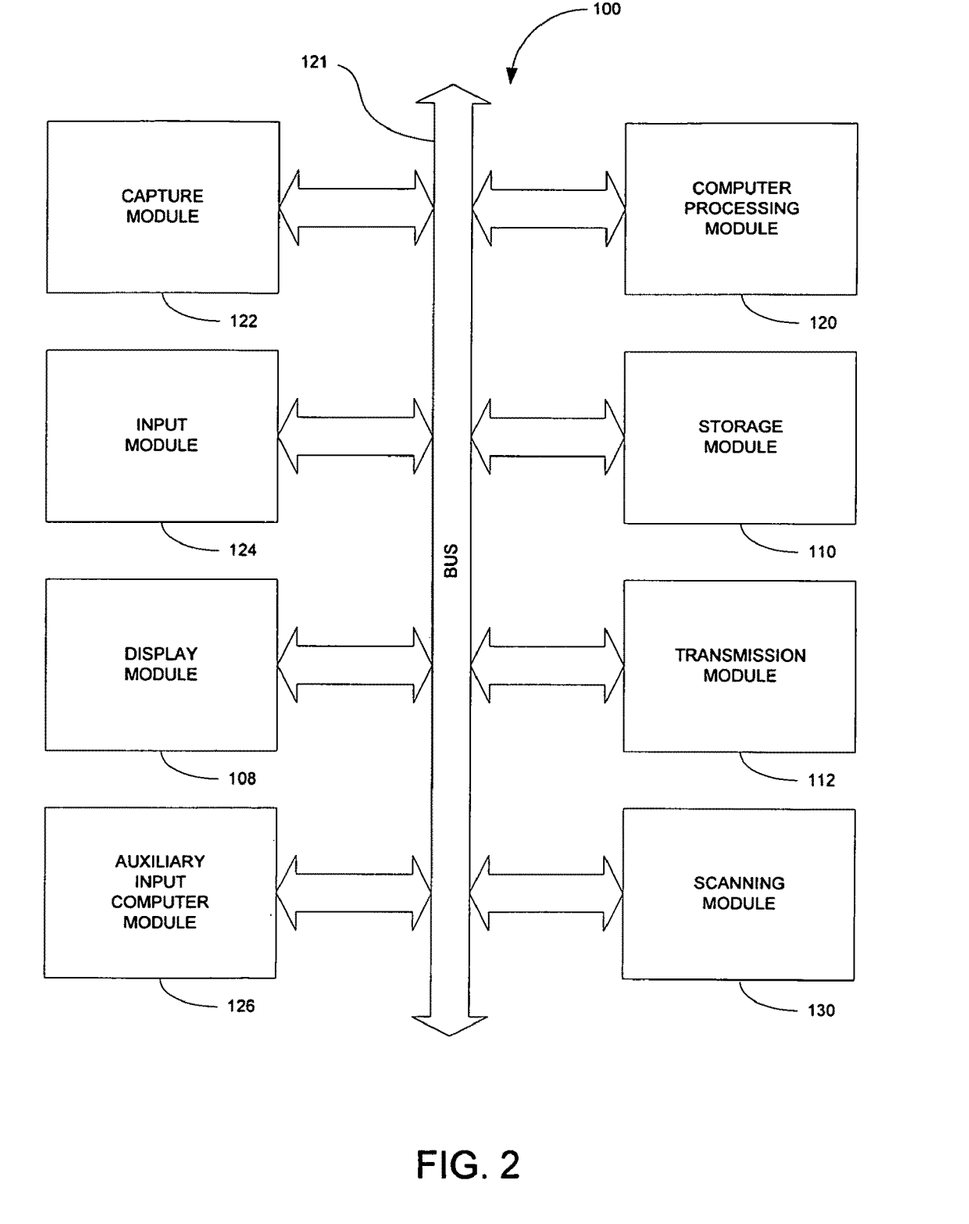
FIG. 2 is a block diagram of various modules included in a device for capturing images and embedding information in the images in accordance with the present disclosure.

Referring to FIG. 2, the various components of the device 100 will now be described. The device will contain a computer processing module 120, e.g., a microprocessor. The computer processing module 120 will use computer software instructions that have been programmed into the module and conventional computer processing power to interact and organize the traffic flow between the various other modules. It is to be understood that the present disclosure may be implemented in various forms of hardware, software, firmware, special purpose processors, or a combination thereof. A system bus 121 couples the various components shown in FIG. 2 and may be any of several types of bus structures including a memory bus or memory controller, a peripheral bus, and a local bus using any of a variety of bus architectures. The device also includes an operating system and micro instruction code preferably residing in read only memory (ROM). The various processes and functions described herein may either be part of the micro instruction code or part of an application program (or a combination thereof) which is executed via the operating system.

It is to be further understood that because some of the constituent device components and method steps depicted in the accompanying figures may be implemented in software, the actual connections between the device components (or the method steps) may differ depending upon the manner in which the present disclosure is programmed. Given the teachings of the present disclosure provided herein, one of ordinary skill in the related art will be able to contemplate these and similar implementations or configurations of the present disclosure.

Capture module 122 will capture an image desired by the user in digital form. The capture module includes an image sensor, an analog-to-digital (A/D) converter and a digital signal processor (DSP). As the user pushes the device's shutter button 124, light is allowed to enter through the lens 102 and shine on the image sensor, e.g., a charge-coupled device (CCD) or complimentary metal-oxide semiconductor (CMOS). The image sensor includes preferably millions of photosensors, e.g., pixels, wherein each pixel absorbs the light and transforms the light into an electric charge proportional to the intensity of light. Each charge is transmitted to an A/D converter where the charge is converted into a digital value representing the color the pixel will be, e.g., representing different intensities of red, green and blue. The digital values are then passed to the digital signal processor which enhances the image, compresses it and then stores it in a digital file format in the storage module 110. The storage module 110 includes internal storage memory, e.g., random access memory (RAM), or removable memory such as a CompactFlash card, Memory Stick, SmartMedia, MultiMediaCard (MMC), SD (Secure Digital) memory, or any other memory storage that exists currently or will exist in the future. The digital file format utilized to store the image is not critical, but may include standard file formats which currently exist or will exist in the future for example jpeg, tiff, bmp, gif, pcx, png or other file formats. If multiple images are captured, the images may be stored in various video formats which currently exist including Divx, Mpeg-2, Mpeg-3, Mpeg-4, Mpeg-5, Quicktime, or other video formats.

The device 100 will also contain a display module 108 for the user to view acquired images. This display may be in any current form in the art, including Liquid Crystal Displays (LCD), Light emitting diode displays (LED), Cathode Ray Tube Displays (CRT) or any other type of display currently existing or existing in the future. The display module 108 will also include an audio output device 128, e.g., a speaker, headphone jack, etc., allowing the user to also hear audio output from the hardware device. An additional but optional embodiment of the present disclosure may also include video or computer output jacks that will allow the user to hook the subject hardware device to an external television display device or a computer.

The hardware device 100 of the present disclosure will contain a user input module 124 to either receive user instructions via text input by the way of a standard keyboard interface or a character recognition capture device which translates user text input into alphanumeric characters. Preferably, the character recognition device is a touch screen which overlays the display module 108 and text is entered via a pen-like stylus. Such input devices are standard and currently available on many electronic devices including portable digital assistants (PDAs) and cellular telephones. Optionally, a microphone 106 will be coupled to the input module 124 for capturing any audio information spoken by the user and the input module will further include an analog-to-digital (A/D) converter for converting the spoken audio information into digital format. Furthermore, the input module may include a voice recognition processor that translates the digital human voice into alphanumeric characters for user input.

The user will utilize the user input module after an image is captured to enter various data that will either be stored as a file associated with the digital image file or, alternatively, written as an additional part of the digital image file. By example, if the digital image is recorded by the hardware device as jpg101 or tif101 or bmp101 where these descriptions indicate the name of the captured digital image, then another file will be created for each captured digital image. This file would be the information associated file. In the above example, the image jpg101 would now have an additional file called info101 (or any other name that the hardware device selects). This digital file would receive and contain the user inputted information. Alternatively, the user input module may write its information directly to the previously stored digital image file. By example, if the digital image is recorded by the hardware device as jpg101 or tif101 or bmp101 where these descriptions indicate the name of the captured digital image, then this file will be appended with the additional information written from the user input module, for example, in the header of the digital image file.

The device 100 will also include an auxiliary input computer module 126. This module will allow the hardware device to automatically and simultaneously (with image capture) store information in the associated file or alternatively in the same file as the digital image. The information from the auxiliary input module 126 will flow directly from the various input modules and processors contained in the hardware device. These modules and processors may include but are not limited to a processor to determine the individual number of the picture in the sequence of pictures shot that are captured and stored, e.g., a sequence number, a Global Positioning System (GPS) chip to determine the geographic location of where the image was taken, a date chip to determine the date and time the image was taken, a voice capture device to capture comments on the image, and various other input processors that will provide additional information relevant to the digital information, all information which the auxiliary input module 126 will store as information in the info files or directly as addenda in the digital image files. Knowledge of the art, indicates that the individual processors such as GPS, date/time and voice storage, may be separate processors or may also be incorporated as one computer processor.

After the digital image is captured and stored on the device 100, these files will be transferred to the user's local computer hardware device or to the Global Computer Network, e.g., the Internet, or to the user's local device and then to the Global Computer Network. This transfer will be done by transmission module 112 including hardwired and/or wireless connectivity. The hardwire connection may include but is not limited to hard wire cabling e.g., parallel or serial cables, USB cable, Firewire (1394 connectivity) cables, and the appropriate port. The wireless connection will operate under any of the various known wireless protocols including but not limited to Bluetooth™ interconnectivity, infrared connectivity, radio transmission connectivity including computer digital signal broadcasting and reception commonly referred to as Wi-Fi or 80211.X (where x denotes the type of transmission), or any other type of communication protocols or systems currently existing or to be developed for wirelessly transmitting data. Furthermore, the transmission module 112 may include a removable memory card slot for accepting any of the various known removable memory cards, transferring the image files to the removable card, and subsequently the images may be uploaded to a computer from the removable memory card by an appropriate reader coupled to the user's computer. The file name of each digital image file and/or associated file will be recorded in a relational database either on the user's local computer or the Global computer network, as will be described in detail below. This database will contain information on any file(s) related to each digital image including audio and video files, or other associated image files.

The user, or any other party, may print out any of the digital images described herein. The printing will be done once the images are stored on the local computer or the Global Computer Network and recorded in a relational database. When the images are printed out, the computer that prints the image will cause the image to be printed with symbology that encodes that file name of the image and file location of the image, or any other coding that will provide access to the file name and file location. This file name may be the assigned name that the image was stored in at the relational database, as well as the assigned location of the relational database whether in the user's local computer or at a stored location on the Global Computer Network. The symbology may be in any form currently practiced in the art including barcodes (e.g., UPC, EAN, PDF417, etc.), photosymbols, standard or specialized text, etc., or any future type of symbology. Of course, as stated, any symbology utilized will represent or lead to the file names and file locations of the digital images.

The device 100 will further include an integrated scanning module 130 that will contain a light source, e.g., LED, and photocell coupled to the computer processing module 120, or alternatively, will includes a separate decoder engine that will decode the data received by the photocell before sending it to the computer processing module 120. Knowledge of the art reveals that many different types of scanners currently exist and the inventor realizes that the type of scanner would depend upon the type of symbology that is utilized in the printed images. The user will be able to scan the printed digital images with the device 100 and the scanning module 130 would scan in the symbology. Using standard computer programming and the computer processing module, the device would translate the symbology to extract the name of the digital image and the file locations (whether local or on the Global Computer Network) of the digital image. Alternatively, the scanner may extract some type of marker or symbol, e.g., an identifier, that when presented to the relational database would indicate the file name and file location of the digital images. This information would then be transferred to the transmission module which will transmit it to the local or Global Computer Network which will then submit it to the relational database containing information on the digital images. Using standard computer programming and processing, this database would then locate the stored digital image and associated files/information and also process the users request(s) regarding the digital image.

If the subject hardware device is coupled to a computer via the transmission module 112, then the hardware device 100 will receive back and display the processed requests on the display module 108. By example, a user may scan in a printed digital image with the hardware device 100 and then receive that image for display on his device, along with auxiliary information on the image, and along with auxiliary and associated audio and video files that can be displayed on the hardware device via the display module 108.

Figure 3A:
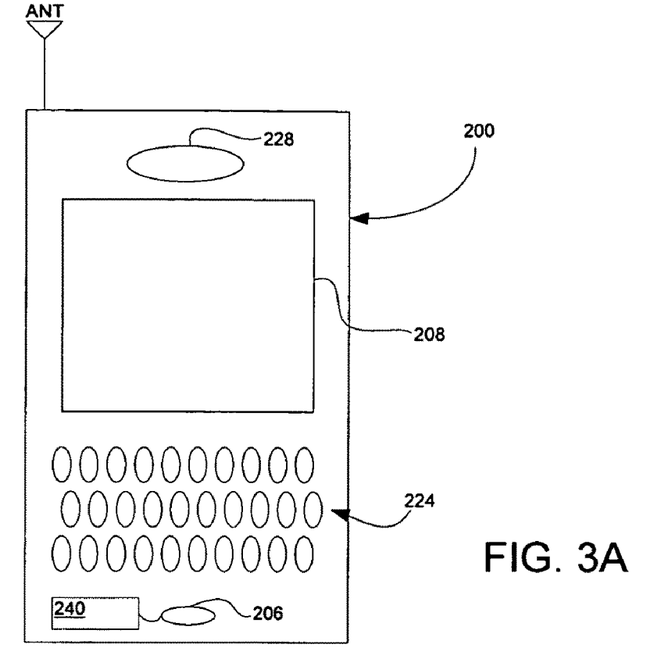
FIG. 3A is front view of a device for capturing digital images and embedding information in the captured images according to another embodiment of the present disclosure.
Figure 3B:
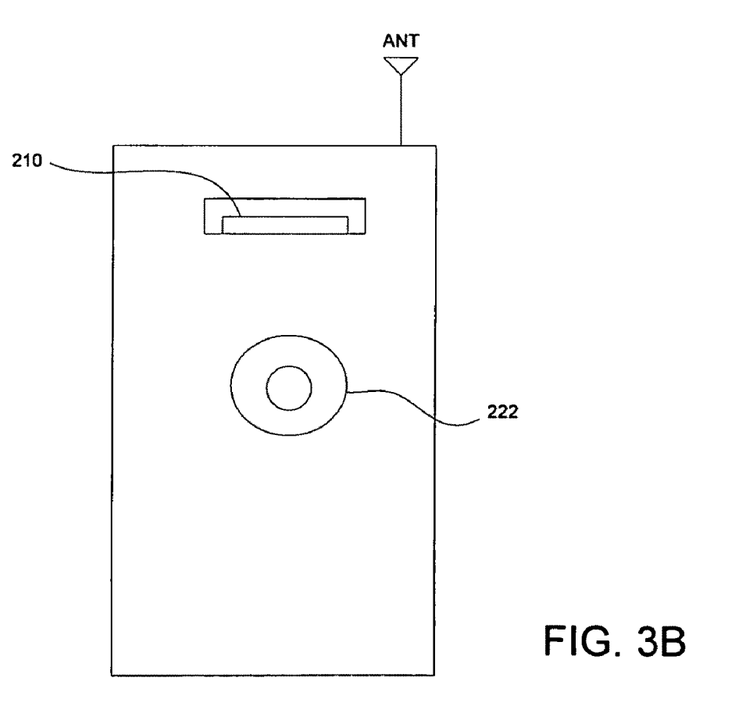
FIG. 3B is a rear view of the device illustrated in FIG. 3A.

Referring to FIGS. 3A and 3B, another embodiment of the present disclosure is illustrated. Here, a device 200 according to the principles of the present disclosure is embodied as a mobile phone including the modules and architecture illustrated in FIG. 2. Device 200 includes a microphone 206 having the same functionality as microphone 106 and is further coupled to a communication module 240 for encoding a user's speech to be transmitted via antenna ANT using CDMA, PCS, GSM or any other known wireless communication technology. Device 200 further includes display module 208 for displaying captured images and preferably the display module will have a touch screen overlaid upon it which will enable user input via a stylus. The user may also enter phone numbers to be dialed via the touch screen. As is known in the mobile phone art, device 200 may include a full QWERTY keyboard 224 as an input module to enter text information to be associated to captured images. Earpiece or speaker 228 may be utilized to play audio clips associated with images in addition to being coupled to the antenna ANT and a decoder for receiving and decoding voice communication from another mobile phone.

Preferably, the antenna ANT is coupled to a transmission module similar to the one described above in relation to FIG. 2. The transmission module will compress and encode captured images for transmission using any known wireless communication technology. Transmitting images via wireless technology will facilitate the transferring of images to an online photo storage site or to an online photo developing service provider.

Referring to FIG. 3B, a rear side of device 200 is shown. Capture module 222 is employed for capturing images and when disposed on a rear side of device 200 is used in conjunction with display module 208 for positioning a subject of the image in lieu of a viewfinder. In this embodiment, the capture module 222 may also be used in conjunction with the scanning module to read symbology associated with an image. Here, the capture module will acquire an image of the symbology and the scanning module will further include a digital signal processor executing an algorithm for deciphering or decoding the symbology from the capture image. The use of an image sensor to read symbology, e.g., a barcode, is known in the art and systems employing such technology is commercially available from Symbol Technologies of New York.

Similar to the embodiments described in relation to FIGS. 1 and 2, device 200 includes a storage module 210 for storing images via a removable memory card.

Figure 4:
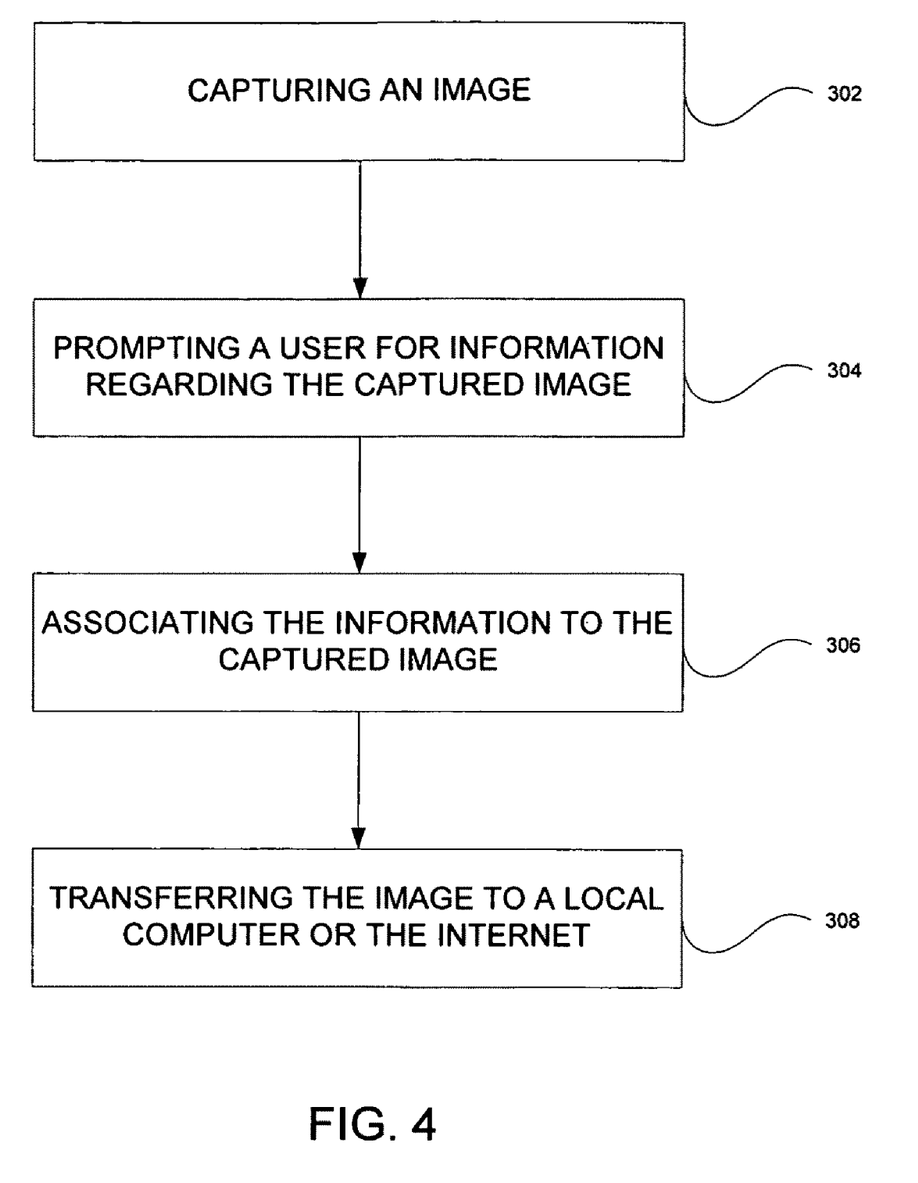
FIG. 4 is a flowchart illustrating a method for embedding information in a digital image according to an embodiment of the present disclosure.

In utilizing the hardware device described herein, the user will be able to accomplish the various applications of the disclosure which are described below in relation to FIG. 4.

A user takes several pictures with his imaging device (step 302). In one example, the picture is of a baby in Las Vegas. The next picture is of a Monet painting hanging in a gallery in Las Vegas. Another picture is of the user's wife. At end of taking pictures or, alternatively, immediately after taking each individual picture, the user goes back to the device 100, 200 and using either keystroke input via input module 124 or voice recognition software via a microphone, or any other input means, the user enters information regarding the pictures. The user may be prompted, e.g., either via the display module or by spoken word via the speaker, to provide the following information regarding the pictures, i.e., the images taken (step 304):

(1) The file location to store the photos or images once they are transferred to permanent memory storage, e.g., a local computer or a server residing on the Internet. For the first picture the user indicates that he would like the photo stored under his baby picture file, e.g., a folder on his local computer, for the second picture his famous art file, and for third picture his file with pictures of his wife.

(2) The user is then asked via the speaker, or prompted on the display module 108, 208, if he wants to attach any audio or video to the images to stay associated with the images once they are stored. He indicates that for the first image he wishes to record an audio file indicating: "This is a picture of my baby girl Samantha here in Las Vegas. Boy is she cute"; for the second image: "Loved this Monet and had previously seen it in at the Louvre last year"; and for the third image: "Jenny is wearing the new dress that I just bought her"; also for number three picture please attach the video file entitled Jenny's day in Las Vegas to this picture.

(3) The user now is asked to enter, via text input or voice recognition or any other input means, whether they will be storing these photos online. The answer would be either Yes or No. If the user answers Yes, a predetermined site could have been selected and pre-stored in the camera hardware device (for instance, the Ofoto or Imagestation site) and selected photos would automatically go to that location for upload when the digital images are transferred.

The hardware device retrieves (from input that it receives from the auxiliary input computer module 126) the time and location of the images. The hardware device also knows (from memory that was pre-stored in the hardware) the name and identification information on the owner of the hardware device or any guest using the device. Moreover, the hardware device will also store the number of the digital image by recording the order that the image was taken in, e.g., the sequence number. The user can also flag (i.e., select) any images that he would like to have printed or e-mailed.

The various information is then compiled and either stored as a separate information file associated to the image or appended to the digital image file and stored for example in the header of the image file (step 306).

The user will now transfer the images to his local computer workstation which may or may not be connected to the Global Computer Network via transmission module 112 (step 308). When the computer receives these imbedded 'smart pix' images, the computer will:

a. Sort and file the images in the file or folder selected including storing the files with the associated information and audio and video attachments;

b. Perform any actions requested for the photos including, e-mail the photos to a selected user or users and print the photos on designated printers in a size pre-selected; and c. With a connection to the Global Computer Network, automatically upload the photos and associated attached files to the specified server site (Ofoto, or Smartpix, for instance) for storage and retrieval.

Once the images are printed, the user will be enabled, regardless of the time elapsed since the images were taken, to take a hardware device (possibly the camera device that the user utilized to take the images, or another hardware reader device) and scan it over a photo. The device will read the symbology in the images and using standard communications techniques including Wi-Fi, Bluetooth, infrared, cabling, etc., the scanning/reading device will transmit the photo identifier information to a computer processor which then may optionally transfer it to the Global Computer Network. The device will then receive the information back from the local processor or Global Computer Network and will then locate the file or files that contain the image and associated attachments on the local or Global Computer Network.

By example, the user holds the scanning device over images of a child on the beach and an audio track then comes back: "Daddy I love this beach and I love you". The user would also be able to instantly receive information on the photo such as when and where the photo was taken and who the photographer was. The user could also request that the photo be printed to a local printer in a specific size or that the picture be e-mailed to a selected recipient. Other user requests could include asking the local computer to display all associated photos, file attachments, or to store the photo in a selected location on the local computer or the Global Computer Network.

Figure 5:
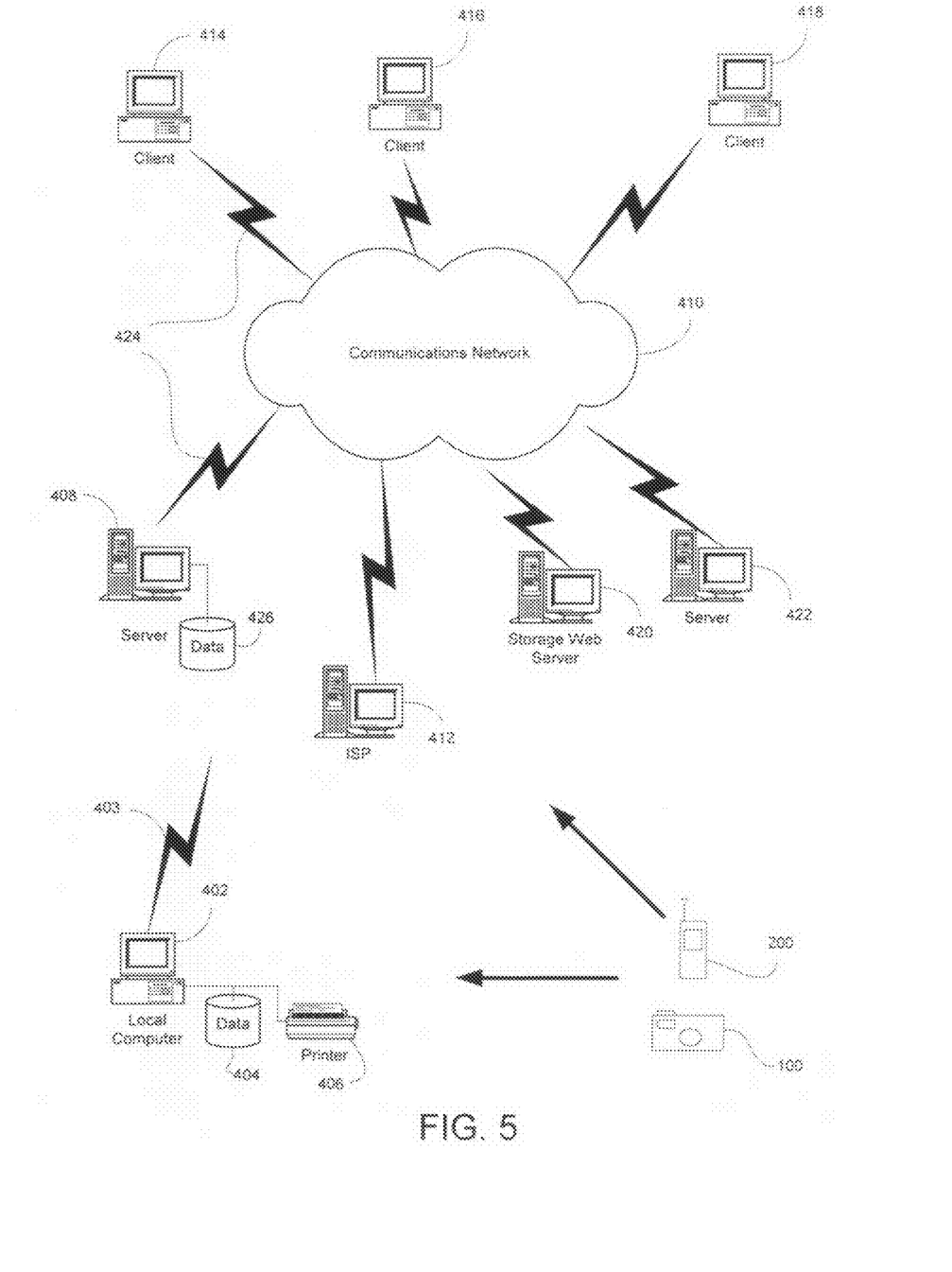
FIG. 5 is a diagram of an exemplary system for managing a plurality of digital images in accordance with an embodiment of the present disclosure.

Referring to FIG. 5, an exemplary system for managing a plurality of digital images in accordance with an embodiment of the present disclosure is illustrated. Digital imaging device 100, 200 will transfer the digital images to a user's local computer 402 or to an online imaging web server 408, e.g., Ofoto, where the plurality of images will be processed and manipulated as will be described below. The user's local computer 402 may connect to communications network 410, e.g., the Internet, by any known means, for example, a hard-wired or wireless connection 403. It is to be appreciated that the network 410 may be a local area network (LAN), wide area network (WAN), the Internet or any known network that couples a plurality of computers to enable various modes of communication via network messages. It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, local computer 402 or web server 408. The local computer 402 and web server 408 will include an operating system and micro instruction code. The various processes and functions described herein may either be part of the micro instruction code or part of the application program (or a combination thereof) which is executed via the operating system. In addition, various other peripheral devices may be connected to the computer platform, e.g., the local computer 402 and web server 408, by various interfaces and bus structures, such as a parallel port, serial port or universal serial bus (USB), for example, additional storage devices 404, 426 and a printer 406.

Alternatively, the user's local computer 402 may connect to the network 410 via an Internet Service Provider (ISP) 412, where once connected, the ISP server 412 will manage the flow of the digital images, e.g., e-mailing the images to other users 414, 416, 418 of the network 410, transmitting the images to online storage web servers 420, and/or manage the flow of information from various web sites connected to the network 410, e.g., content providers residing on servers 422. Furthermore, the ISP 412 will include a mail server for handling electronic mail, e.g., e-mail. The mail server will include the appropriate applications and/or servers for handling incoming mail, e.g., Simple Mail Transfer Protocol (SMTP), and outgoing mail, e.g., Post Office Protocol 3 (POP3).

Although the physical environment in FIG. 5 shows the connected devices as computers, such illustration is merely exemplary and may comprise various digital devices, such as PDAs, network appliances, notebook computers, etc. The computing devices may communicate to the servers 408, 412, 420, 422 and network 410 via any known communication link 424, for example, dial-up, hardwired, cable, DSL, satellite, cellular, PCS, wireless transmission (e.g., 802.11a/b/g), etc. Furthermore, the devices will communicate using the various known protocols such as Transmission Control Protocol/Internet Protocol (TCP/IP), File Transfer Protocol (FTP), Hypertext Transfer Protocol (HTTP), etc.

Figure 6A:
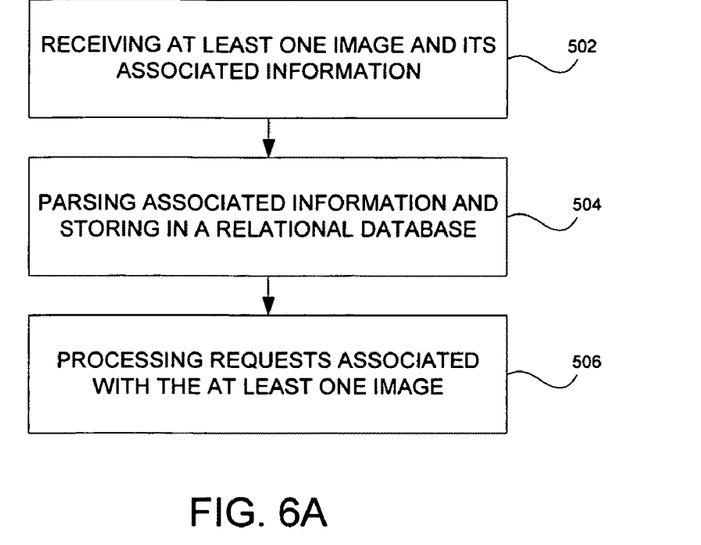
FIG. 6A is a flowchart illustrating a method for receiving at least one image with its associated information and processing requests associated with the at least one image.
Figure 6B:
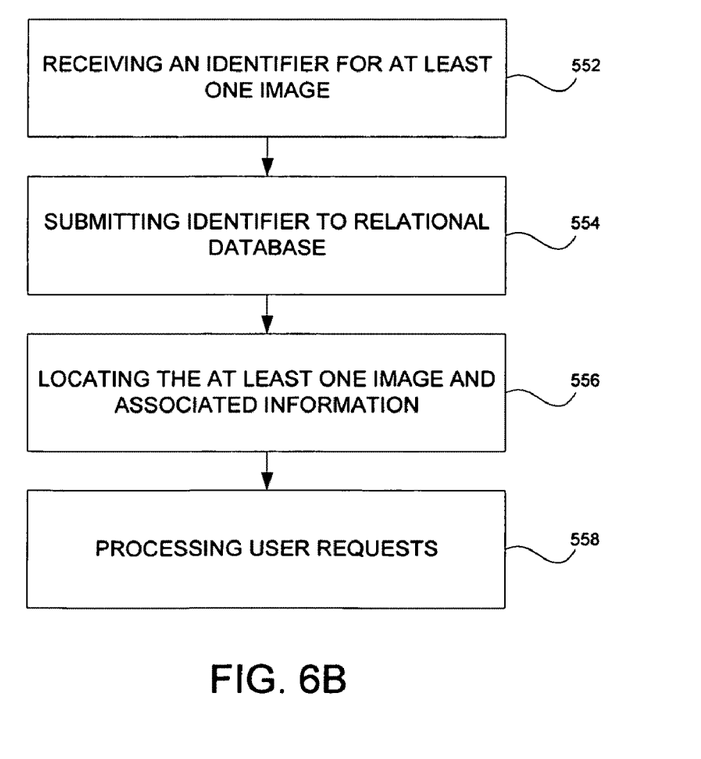
FIG. 6B is a flowchart illustrating a method for retrieving an image and processing user requests.

FIGS. 6A and 6B are flowcharts illustrating methods being executed by programmable instructions either at the local computer 402 or the imaging web server 408. Although the following description will be described in relationship to methods being implemented by software on the local computer 402, the methods can be implemented at web server 408 after the images are transferred to the web server 408 via the Internet.

Figure 7:
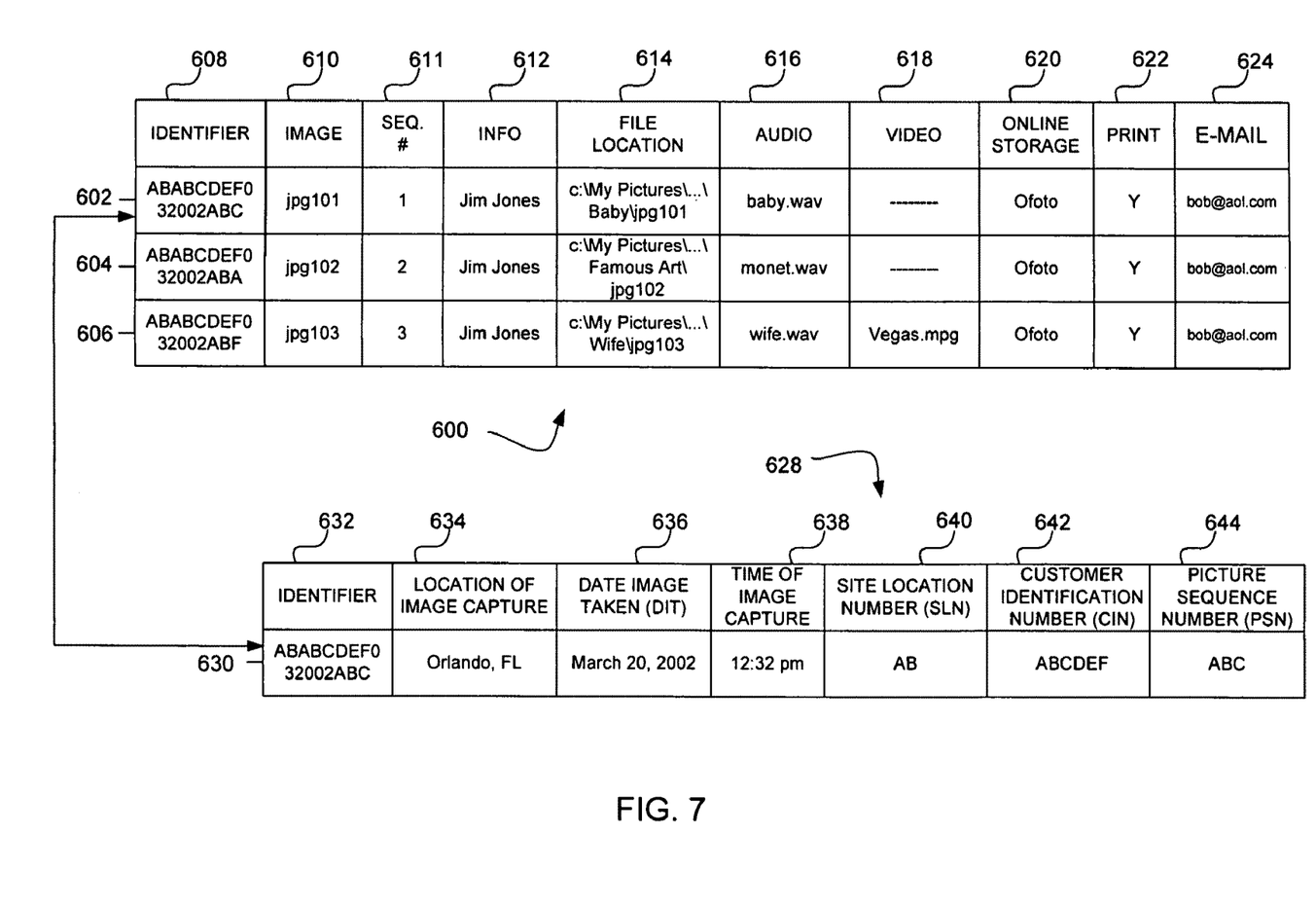
FIG. 7 is a diagram of at least three records of a relational database employed in accordance with the present disclosure.

Referring to FIG. 6A, once information is associated to at least one digital image, the image and associated information is transferred from device 100, 200 and received by local computer 402 (step 502). The local computer 402 will parse the associated information and store each piece of data as a separate field in a single record in a relational database (step 504). An exemplary database 600 is shown in FIG. 7. The database 600 includes a record 602, 604, 606 for each image and further includes a plurality of fields for each record. For example, record 602 includes an identifier field 608 for storing any alphanumeric identifier associated with the digital image, an image field 610 including the file name of the image, a sequence number field 611 for storing an image sequence number, an info field 612 which may include user/owner information (e.g., author, photographer, publisher), subject matter information, an image description, a keyword associated to the image, etc., and a file location field 614 for storing the location where the image file is stored. Record 602 also includes an audio field 616 for storing the file name of an associated audio file and a video field 618 for storing the file name of an associated video file. Record 602 further includes request fields, e.g., online storage request field 620, print request field 622 and e-mail request field 624, which will cause the local computer to process and take further action with regard to the image transferred, which will be described in more detail below.

Next, in step 506, the local computer 402 will use relational database programming, e.g., Structured Query Language (SLQ), and standard computer processing power to respond to any user requests for each of the digital images. These requests include but are not limited to displaying the digital images in a particular sequence, or sorting the digital images by owner, date, location, description, etc. The local computer 402 will query each record of the relational database to determine if an action has been requested. For example, the local computer will query e-mail request field 624 to determine if the image is to be e-mailed to another. As shown in FIG. 7, e-mailing the digital images to a person has been indicated by the user, with such person's e-mail address being stored in the relational database, e.g., bob@aol.com. As another example, the local computer 402 will query print request field 622 to determine if the user has flagged the image to be printed upon transfer. The record may include further information regarding printing the image such as a printer location (either local or on the Global Computer Network) and in a size or format that has been requested by the user. As an even further example, the local computer 402 may query online storage request field 620 to determine if the user wants to store the image on a public server for viewing purposes. The field 620 may include the name or location of a professional photo processing location on the Internet, such as ImageStation or Ofoto. Although not shown, each record may include other request fields, for example, fields for requesting the display of information on any selected digital image, such information being contained in the relational database, or the display of related audio or video or image files. The inventor understands and current computer database and computer processing techniques teach, that various other requests to the computer processor regarding the digital images and associated files/information may be made by the user, and by using standard programming and computer processing power these requests will be completed by the computer and presented to the user.

The user, or any other party, may print out any of the digital images. The printing will be done once the images are stored on the local computer 402 or a web server 408 on the Global Computer Network and recorded in the relational database 600 as described above. When the images are printed out, the computer that prints the image will cause the image to be printed with symbology that encodes the file name of the image and file location of the image. This file name will be the assigned name that the image was stored in at the relational database, as well as the assigned location of the relational database whether in the user's local computer or at a stored location on the Global Computer Network. Alternatively, the symbology will represent a unique identifier that is created for each image as stored in field 608 of each record in the database. The symbology may be in any form currently practiced in the art including barcodes, photosymbols, standard or specialized text, etc, or any future type of symbology. Of course, any symbology utilized will represent the file names and file locations of the digital images either directly or via an identifier.

At any time, a user may now scan the printed digital images. This scanning may be done by any type of scanner that could read the symbology contained in the printed digital images. Many different types of scanners that read symbology currently exist and the inventor realizes that the type of scanner would depend upon the type of symbology that is utilized in the printed images. Preferably, the scanning of a printed digital image will be performed by the hardware devices 100, 200 described above including the appropriate scanning module.

The device 100, 200 would scan in the symbology and using standard computer programming and computer processing, translate the symbology to extract the name of the digital image and the file locations (whether local or on the Global Computer Network) of the digital image, or alternatively, the identifier of the record relating to the image. This information is then transmitted to the user's local computer along with a user request. In another embodiment, this information would be submitted to the location of the computer indicated in the symbology and, at that location, this query would be submitted to the relational database containing information on the digital images.

The local computer 402 will receive the file name and location or image identifier for at least one image in step 552. Using standard computer programming and processing, the identifier will be submitted to the database (step 554) and the database would then locate the stored digital image and associated files and/or information via its corresponding record (step 556). Once the record is found, the computer will process any user request(s) (step 558) regarding the digital image that was either transferred with the identifier or after the identifier located the appropriate record. Such requests could include but would not be limited to displaying the digital images in a particular sequence at the local computer or on the imaging device 100, 200; e-mailing the digital image to a person that has been indicated by the user, with such person's e-mail address being stored in the relational database; and printing the digital images at a printer location (either local or on the global computer network) and in a size or format that has been requested by the user. Furthermore, a request may include a request for displaying information on any selected digital image, such information being contained in the relational database, for example, displaying audio or video or image files that are related to the selected digital image. Depending on the request, the image and associated information may be displayed or presented to the user at the local computer 402 or the image and associated information may be transmitted to the imaging device 100, 200 for presentation to the user.

By example, the user holds a scanning device, e.g., imaging device 100, mobile phone 200, etc., over an image of a child on the beach processed via the system and method of the present disclosure. An audio track then comes back: "Daddy I love this beach and I love you" audibly produced via speaker 128, 228 on the device 100, 200 respectively, or alternatively, the image and audio track are presented to the user if they are at the local computer 402. The user would also be able to instantly receive information on the photo such as when and where the photo was taken and who the photographer was. The user could also request that the photo be printed to a local printer in a specific size or that the picture be e-mailed to a selected recipient. These further requests could be entered either via a keyboard/mouse at the local computer 402 or via input module/speech recognition at the device 100, 200. Other user requests could include requesting the computer to display all associated photos, file attachments, or to store the photo in a selected location on the local computer or the Global Computer Network.

It is to be appreciated that the software utilized to implement the above methods could reside at server 408 with relational database 600 residing in storage medium 426. Here, the user may employ local computer 402 to transfer the digital images and requests to server 408. In this embodiment, a user could access any of the plurality of images and associated information from any location in the world having access to the Internet. Furthermore, the use of a mobile communication device such as device 200 described above would facilitate the transferring of images and requests to the server 408 by way of a wireless connection either directly to the server 408 or via ISP 412 to the server 408.

Once the digital images are resident on the user's local computer or on the Global Computer Network, the user may utilize a user interface to search for any of the stored images. The user interface may include voice recognition software (VRS), keyboard input (KI) or any other user interface currently existing or that will exist in the future to submit a search query term to the computer to search for a digital image or images. The computer will utilize a search software module (SSM) that may include relational database software, a browser plug-in, etc. to submit a search query to the database including the images and associated information as described above. This search software module (SSM) will be directed by the VRS, KI or any other user input device to the location or site on the local computer or Global Computer Network where the digital images reside. The SSM will then submit the query for comparison to the various information data fields that are contained in the digital image file or associated file (e.g. such as date field 636, name field 610, time field 638, sequence number field 644, location field 634, author/publisher field 612, subject matter category field 612, keyword field 612, etc), and, using standard computer processing power, will select the digital image or images that contain the submitted query. The selected digital images will be then displayed on the local computers display device 402. Depending on the user's specific request, the user is able to instruct the computer to display and/or sort the digital images by various sort criteria including but not limited to: date the digital image was taken; name of the image; time the image was taken; sequence number of the image; geographic location that the digital image was taken at; author and/or publisher of the image; subject matter of the image; keyword for the image; and any other sorting variable that the user selects.

It is to be appreciated that the SSM has the ability to submit multiple queries to the processor and as such to set multiple search criteria for selecting the desired digital image(s). By example, a user could ask the SSM to select an image or images for display that were taken at a certain time and at a certain location, and by a certain author/photographer.

Once the selected digital image or images are displayed, the user will also be able to additionally process these images. The user will be able to e-mail any image or images to any other party using standard e-mail software which currently exists by communication through the Global Computer Network, e.g. the Internet. The user will also be able to print out any image again using standard printer software which also currently exists in many formats. Printing software will allow the user to print the image to a local printer or using the Global Computer Network to print the image to a selected printer connected to the Global Computer Network. The user will be able to purchase any digital image or images by using standard e-commerce software which also currently exists in many forms. The user will also be able to playback associated music or video files or display other associated still images. Furthermore, the user will click on the subject digital image and the image will tell the user the location or location of the associated files. The user will then be taken to this location by standard hyperlink technology. Once the user has located the associated file or files, the user will use standard software playback software such as Itunes™, Real Video, Microsoft™ Media Player, Kodak™ Photo Viewer, or other software, to play and display the selected file(s) on the user's local computer display.

Additionally, the user will be able to resize any selected digital image. The user will select the image and the image will be submitted to standard digital image software which is commonly available. This software will resize the selected image and display it on the user's local computer display. The user will also be able to invite other users on the Global Computer Network to simultaneously share or view the selected digital image(s). The selected digital image will be presented to standard Instant Messaging software such as AOL™ Instant Messenger or Microsoft™ Instant Messenger, and using the Global Computer Network, other parties will be notified and be able to view the selected image.

A user will also be able to perform the above tasks when viewing digital images on the Global Computer Network providing that the images are "smart pix" images and encoded as disclosed herein. For example, a user browsing web sites on the Global Computer Network comes across a digital image that he is interested in. The User mouse clicks or otherwise selects the entire image or a particular marked and identified spot on the image, e.g., a hot spot. In one embodiment, the hot spot in the digital image will be marked with some kind of indication that indicates that this is the location containing the hot spot. In other embodiments, the hot spot may be the identifier or symbology displayed on or with the image. When the user communicates with the computer via keyboard input, mouse input, voice recognition, etc. and identifies the hotspot for the digital image, a link contained within the digital image will come up and that will link the user to the associated file or alternatively to the digital file contained within the digital image. The user will then be able to receive information on the digital image that they are viewing on their local computer display including but not limited to: date the digital image was taken; name of the image; time the digital image was taken; sequence number of the image; geographic location that the digital image was taken at; author and/or publisher of the image; subject matter of the image; keyword for the image; and any other sorting variable that the user selects. Additionally, the user would be able to instruct the computer to process any individual image or a multiple of images and perform the requests identified above, such as: e-mail the digital image to any other person through the Global Computer Network using standard Internet e-mail protocols such as AOL™ mail, Microsoft™ Outlook, Microsoft™ Express; purchase the digital image through an e-commerce site on the Global Computer Network; resize the image on the computer display device to the user's specifications using standard computer software for digital images such as Kodak™ Digital Imaging Software, Microsoft™ Digital Imaging software, etc.; request that associated audio or video or digital image files be played and/or displayed using the computers audio/video/digital image software including Itunes™ for music, Microsoft™ Media Player for music or video, RealPlayer™ for music or video, Kodak™ or Microsoft™ Digital Imaging software for Pictures; print the digital image on a local printer or on any other printer that the user has access to on a local network or on the Global Computer Network; and allow other users on the Global Computer Network to simultaneously share or view and comment on the image by accessing the user's standard Instant Messaging software including AOL™ Instant Messaging and Microsoft™ Instant Messaging.

Figure 8:
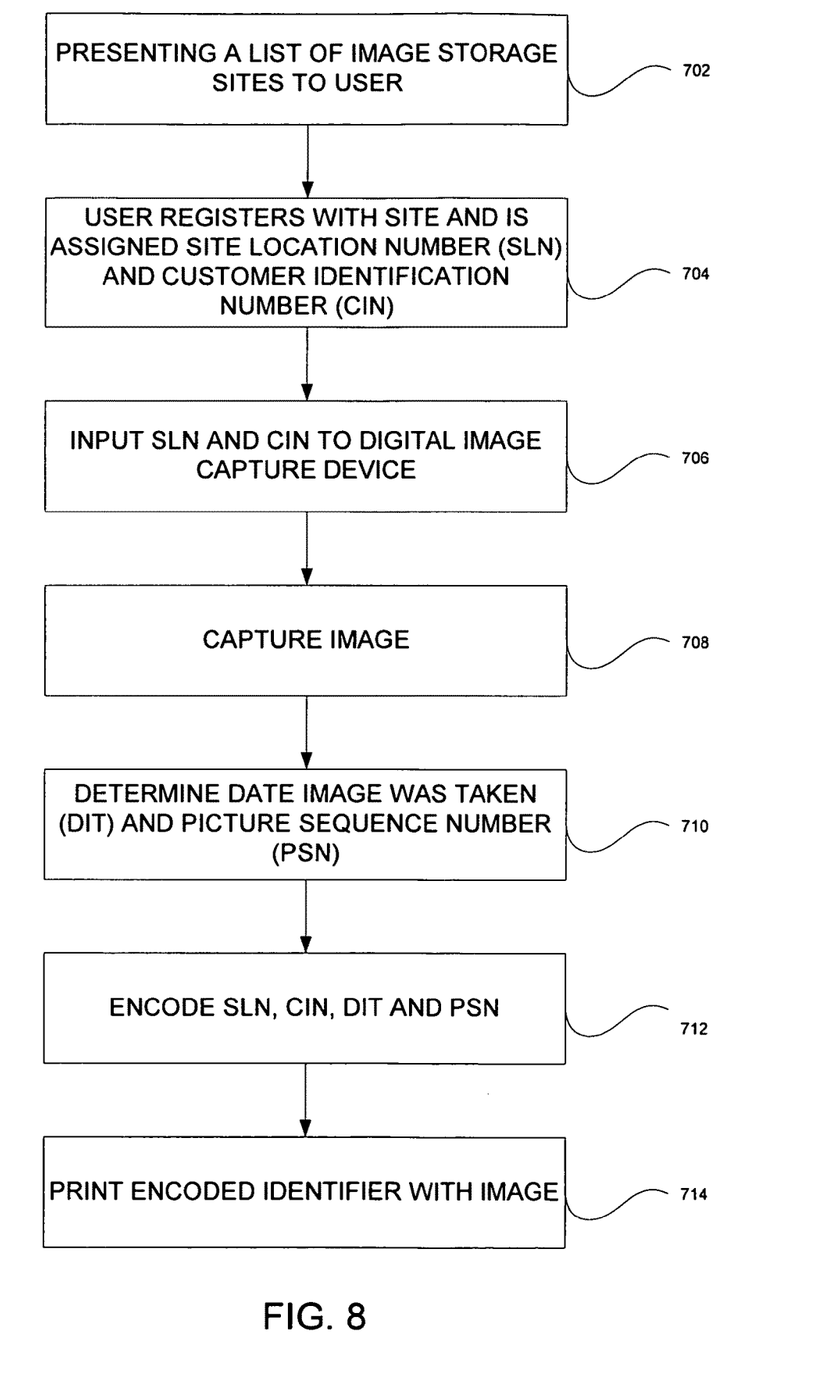
FIG. 8 is a flowchart illustrating a method for encoding an identifier for at least one digital image.
Figure 9:
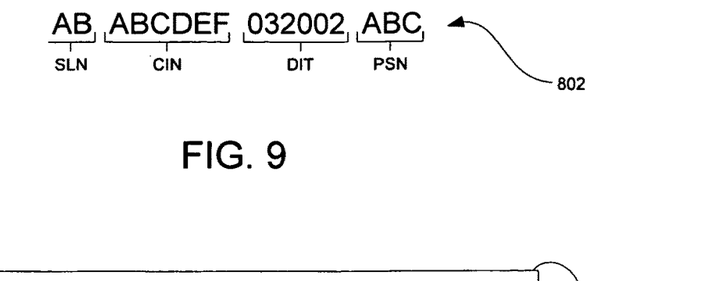
FIG. 9 is an exemplary identifier in accordance with the present disclosure.

The designing and affixing of a symbology or identifier into the digital and printed images will now be described in further detail in relation to FIGS. 7, 8 and 9.

Initially, a user will select a location for storage of the images the user will capture. The storage location may be folder on the user's local computer. Preferably, the storage location will be an image storage web site on the Internet. In selecting an image storage web site, the user will be presented with a list of image storage web sites in various medium (step 702). The user will utilize the user input module 124 to indicate which global computer network site (e.g., web site on the Internet) that he wishes the digital images to be stored at. In one embodiment of the present disclosure, the user would be supplied on printed media (such as paper) or digital medium (e.g., a CD, DVD, Flash Memory, or any other digital storage medium) a list to select storage sites for the digital images. The user would then use a computer to connect to one of these sites on the Global Computer Network and, upon connection, would register with the site and be assigned a site location number (SLN) for this global computer storage site, as well as a customer identification number (CIN) (step 704). The user would then input this information to the digital image capture device 100 with the user input module 124 via text character recognition or voice recognition (step 706).

In another preferred embodiment of the present disclosure, the user would be supplied a digital medium (e.g., a CD, DVD, Flash Memory, or any other digital storage medium) with a list to select storage sites for the digital images. The user could then use a computer to read the digital medium and would then select the digital storage site that he wished to connect to. The computer would use standard hyperlink protocols to take the user to the Global Computer Network website for the selected digital image storage site. Upon connection, the user would register with the storage site and be assigned the site location number (SLN) for the global computer storage site, as well as a customer identification number (CIN) (step 704). The user may then hook up the digital image capture device 100 to the Global Computer Network through the transmission module 112, and the SLN and CIN would be written to the auxiliary input computer module 126 (step 706). Alternatively, the user could manually input the SLN and CIN using the user input module 124.

In still another embodiment of the present disclosure, the user may receive the digital image capture device 100, 200 with a list of user selectable digital image storage sites preprogrammed into memory. The user would use the user input module 124 in conjunction with the computer processing module 120 and the display module 108, to select the site that the user wished to store the digital images at. The user would then connect the digital image capture device 100 to the Global Computer Network via the transmission module 112. Upon connection, the user would register with the storage site and be assigned the site location number (SLN) for the global computer storage site, as well as a customer identification number (CIN) which would appear on the display module (step 704). This information would then be transferred via the transmission module 112 and written to the auxiliary input computer module 126 (step 706). Alternatively, if the communications device 200 is employed, the device 200 will be able to connect to the global computer storage site without being connected to a local computer.

When the digital image is captured by the digital image capture device (step 708), the SLN and CIN as well as the date the image was taken (DIT) and the picture sequence number (PSN) will be written to the associated file or the digital image file for every image that is captured (step 710). The DIT and PSN will be derived by the auxiliary input computer module 126 as described above. The digital image capture device 100, 200 will use the computer processing module 120 to encode the SLN, CIN, DIT and PSN as will be described below (step 712).

In one embodiment of the present disclosure, the SLN will be encoded as a two-digit English language alpha string that is not case sensitive. This will mean that there are 26 alphabet possibilities for each digit since there are 26 letters in the English alphabet. Mathematics tells us that a two letter alpha string that is not case sensitive would allow 676 possible combinations for the string. Alternatively, a two-digit alphanumeric string may be used which would allow 1296 possible combinations for the string.

The CIN will be encoded as a six or seven digit English language alpha string that is not case sensitive. This will mean that there are 26 alphabet possibilities for each digit since there are 26 letters in the English alphabet. Mathematics tells us that a six letter alpha string that is not case sensitive would allow more than 308 million possible combinations for the string. A seven digit alpha string that is not case sensitive would allow more than 8 billion possible combinations. Alternatively, each digit may be comprised of an alphanumeric character.

The DIT will be encoded as a six digit English language date description in the standard American Month, Day, Year (e.g. 010104) format or the European Day, Month, Year (e.g. 301204) format. In either format, this numeric string will denote the date that the digital image was captured and will be supplied to the auxiliary input computer module 126 in conjunction with the computer processing module 120.

The PSN will be encoded as a three-digit English language alpha string that is not case sensitive. This will mean that there are 26 alphabet possibilities for each digit since there are 26 letters in the English alphabet. Mathematics tells us that a three letter alpha string that is not case sensitive would allow more than seventeen thousand possible combinations for the string. Alternatively, each digit may be comprised of an alphanumeric character which would increase the number possible combinations for the string. The PSN will be supplied by the auxiliary input computer module 126 in conjunction with the computer processing module 120.

The inventor realizes that in other embodiments of the present disclosure other languages besides English may be substituted and used for the character strings, and that in certain cases alpha, numeric, and symbolic characters may be included in the character strings that make up the SLN, CIN, DIT and PSN. Moreover, as additional combinations are needed for the SLN, CIN, DIT and PSN in different embodiments additional characters may be added to produce further numerical combinations.

After the digital image is captured and stored on the subject digital image capture device 100, 200, these files and associated information will be transferred to the user's local computer hardware device or to the Global Computer Network, or to the user's local computer device and then to the Global Computer Network. This transfer will be done by standard digital file transfer means via transmission module 112 including but not limited to hard wire cabling, USB interconnectivity, infrared interconnectivity, Firewire (1394) connectivity, Bluetooth™, removable flash memory cards, Wi-Fi, or any future transmission means. The file name of each digital image file or associated file will be recorded in relational database 600 as well as the files themselves, either on the user's local computer or the Global Computer Network. Referring to FIG. 7, the information captured necessary to create the symbology or identifier for each image captured will either be incorporated into table 600 or stored as a separate table 628 which is linked to table 600 via the use of private and foreign keys as is known in the art. Record 630 will include all the information necessary for encoding the symbology or identifier. For example, record 630 will include an identifier field 632 for storing the encoded identifier which could also be used as a key for linking the tables, a location of image capture field 634, a date the image was taken (DIT) field 636, a time of image capture field 638, a site location number field (SLN) 640, a customer identification number (CIN) field 642, and a picture sequence number (PSN) field 644.

Once transferred to the user's local computer or storage site, the identifier will be encoded by interacting with the relational database. The local computer processing unit (CPU) will extract the necessary information by parsing the associated information from the database and encode an identifier for each image (step 714) and, subsequently, store the identifier back in the database. Referring to FIG. 9, an exemplary identifier 802 is illustrated. As can be seen, the identifier 802 includes at least the SLN, CIN, DIT and PSN. The SLN is retrieved from field 640 of record 630, the CIN is retrieved from field 642, the DIT is determined from the date in field 636 and the PSN is retrieved from field 644.

Figure 10A:
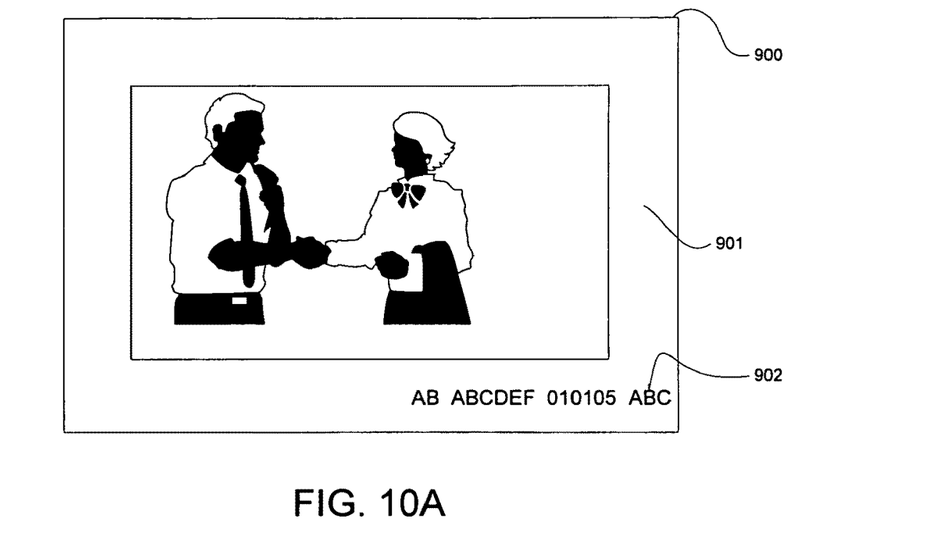
FIG. 10A is a view of a printed image including an alphanumeric identifier.

The user, or any other party, may print out in hardcopy form any of the digital images described herein. The printing will be done once the images are stored on the local computer or the Global Computer Network and recorded in a relational database as described above. The computer processor unit (CPU) that is connected to the printer will read the digital image file and may visually display the image on the CPU's attached display unit. The symbology or identifier will also be read and this information will be sent to the printer by the CPU to be printed with the digital image in a hardcopy. Based on user input, the CPU will direct the printer to place the symbology in a certain location on the digital image such as top right, top left, bottom right, bottom left, or reverse side of the image. Referring to FIG. 10A, a hardcopy printed image 900 is shown with identifier 902 printed in a border 901 of the image.

Figure 10B:
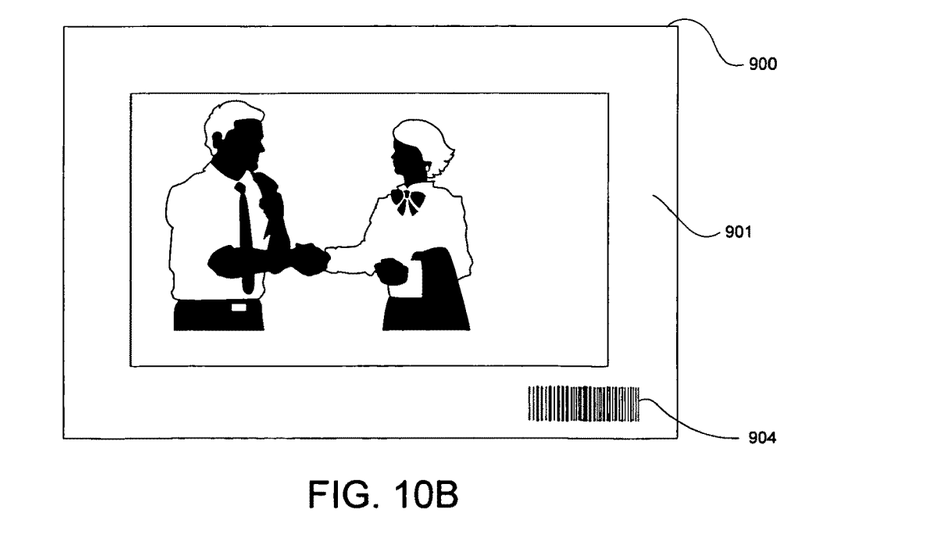
FIG. 10B is a view of printed image including a barcode identifier.

In another embodiment of the present disclosure, the CPU will translate and encode the SLN, CIN, DIT, and PSN to a barcode 904 or barcodes that will print on the image at a user specified location as illustrated in FIG. 10B. In one embodiment, the barcode would be encoded to read as the SLN as the first two digits, the CIN as the next six or seven digits, the DIT, as the next six digits, and the PSN as the next three digits. Various types of standard barcode formats including but not limited to EAN-13, EAN-13 plus 2, EAN-8, UPC-A, UPC-E, Code 11, Code 39, Code 128, PDF417 or any other custom barcode formats may also be employed. The inventor realizes and the art teaches that other types of symbology would also be able to be used to encode the digital file information.

Once the digital images are printed, the user will input the symbology codes or identifier into a wired or wireless device that will connect to the Global Computer Network (i.e., the Internet). When the identifier or symbology is employed as an alpha string as shown in FIG. 10A, the user may simply enter the string via the capture recognition device or spoken audio. In another embodiment, the user may scan in the symbology (e.g., a barcode as shown in FIG. 10B) to a wired or wireless device that will connect to the Global Computer Network (i.e., the Internet). In either embodiment, the user will connect to a pre-specified site on the Internet that shall serve as a Server Lookup site (SLS). Referring back to FIG. 5, any server 408, 420, 422 may serve as the SLS site in addition to being a storage site such as server 420. This SLS site will include a relational database that will list all digital image storage sites. The user's wired or wireless device will then submit the SLN information to this SLS site and, using standard computer processing power and hyperlink protocols, the SLS site will then transfer the user to the site that the subject digital image is stored at. Once transferred to the appropriate storage site, the user's wired or wireless device will also submit the CIN, DIT and PSN information to this site. Using relational database software and standard computer processing power, the subject site will then locate the stored digital image and any associated files for the image. The site will then process any user request for the digital image such as printing the digital image at a local or global printer, e-mailing the digital image to a recipient or recipients on the Global Computer Network, providing information on the subject image, etc.

The principles of the present disclosure will allow users numerous applications for these imbedded "smart pix" including retrieving image and information from third parties, e.g., a publisher or clearing house. By way of example, a user could see an image in a newspaper or magazine and the user could scan the photo with the hardware device described above. The user could then order the photograph to be downloaded to the user's local computer; request and receive information from the publisher of the image; request and receive other information on the image including attachments; e-mail the photo to someone else; and/or direct the photo to be printed for pickup at a local computer printer or at a commercial printer location.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for managing a plurality of digital images over a network comprising:
   receiving, at an imaging web server coupled to the network, a digital image file along with information associated to the digital image file, wherein the digital image file comprises data representing a digital image and the associated information includes at least one of a location of the imaging web server, a customer identification number, a date image was taken, a picture sequence number, a name of the digital image, a time the digital image was taken, location where the image was taken at, author/publisher of the digital image, subject matter of the digital image; keyword for the digital image file and a name of the imaging web server;
   parsing the associated information to extract multiple pieces of information from the associated information;
   coding the multiple pieces of extracted information of the associated information to create an identifier for the digital image file;
   storing the digital image file and the identifier in a database coupled to the imaging web server;
   receiving a search request;
   querying the database with the search request;
   retrieving at least one requested digital image file matching the search request; and
   presenting at least one requested digital image corresponding to the at least one requested digital image file to a user.

2. The method as in claim 1, further comprising the step of printing the digital image with a visual representation of the identifier.

3. The method as in claim 1, further comprising the steps of:
   receiving the identifier of the digital image file and at least one request;
   querying the database to retrieve a record associated to the digital image file based on the identifier; and
   processing the at least one request with information in the record associated to the digital image file.

4. The method as in claim 3, wherein the at least one request is displaying of the digital image in a particular sequence, printing of the digital image, e-mailing of the digital image file or storing the digital image file on a second server coupled to the network.

5. The method as in claim 1, further comprising the steps of:
   positioning a hot spot on the at least one requested digital image; and
   selecting the hot spot, wherein upon selection the associated information for the corresponding requested digital image is presented to the user.

6. The method as in claim 1, further comprising the steps of:
   positioning a hot spot on the at least one requested digital image; and
   selecting the hot spot, wherein upon selection the user is linked to at least a second server storing the at least one requested digital image file.

7. The method as in claim 1, further comprising the steps of:
   receiving a user request pertaining to the at least one requested digital image; and processing the user request with the associated information of the at least one requested digital image.

8. The method as in claim 7, wherein the user request is e-mailing of the at least one requested digital image file, purchasing of the at least one requested digital image, resizing of the at least one requested digital image, playing of associated audio or video of the at least one requested digital image, printing of the at least one requested digital image, or simultaneously sharing of the at least one requested digital image file with at least a second user.

9. The method as in claim 1, wherein the identifier is an alphanumeric string.

10. The method as in claim 1, wherein the identifier is a barcode.

11. The method as in claim 1, wherein the identifier is the printed digital image.

* * * * *